(12) United States Patent
Zhou

(10) Patent No.: US 12,118,194 B2
(45) Date of Patent: Oct. 15, 2024

(54) DESKTOP LAYOUT METHOD AND APPARATUS, AND ELECTRONIC DEVICE

(71) Applicant: VIVO MOBILE COMMUNICATION CO., LTD., Guangdong (CN)

(72) Inventor: Xuan Zhou, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/187,118

(22) Filed: Mar. 21, 2023

(65) Prior Publication Data

US 2023/0221846 A1    Jul. 13, 2023

Related U.S. Application Data

(63) Continuation of application No. PCT/CN2021/119285, filed on Sep. 18, 2021.

(30) Foreign Application Priority Data

Sep. 25, 2020  (CN) .......................... 202011025778.X

(51) Int. Cl.
*G06F 3/04842*  (2022.01)
*G06F 3/0488*  (2022.01)

(52) U.S. Cl.
CPC ........ *G06F 3/04842* (2013.01); *G06F 3/0488* (2013.01)

(58) Field of Classification Search
CPC ............... G06F 3/04842; G06F 3/0488; G06F 2203/04803; G06F 2203/04808; G06F 3/0481; G06F 3/04883; G06F 3/04886
See application file for complete search history.

(56) References Cited

U.S. PATENT DOCUMENTS

| | | | |
|---|---|---|---|
| 2014/0013256 A1 | 1/2014 | Wan et al. | |
| 2016/0163052 A1* | 6/2016 | Kim | G06V 10/273 |
| | | | 715/766 |
| 2017/0031563 A1 | 2/2017 | Zhang et al. | |
| 2017/0123645 A1* | 5/2017 | Xu | G06F 9/44 |
| 2023/0229286 A1* | 7/2023 | Liao | G06F 3/04842 |
| | | | 715/764 |

FOREIGN PATENT DOCUMENTS

| | | |
|---|---|---|
| CN | 103207750 A | 7/2013 |
| CN | 103914211 A | 7/2014 |
| CN | 104360798 A | 2/2015 |
| CN | 106843652 A | 6/2017 |
| CN | 108121485 A | 6/2018 |
| CN | 110442277 | * 11/2019 |
| CN | 110442277 A | 11/2019 |
| CN | 112148405 A | 12/2020 |
| EP | 2487578 A1 | 8/2012 |

* cited by examiner

*Primary Examiner* — Cao H Nguyen
(74) *Attorney, Agent, or Firm* — Price Heneveld LLP

(57) ABSTRACT

This application provides a desktop layout method and apparatus, and an electronic device. The method includes: when a desktop of an electronic device is in a desktop layout setting state, determining N icon regions on a desktop page of the electronic device according to a region selection input of a user, where each icon region is obtained by performing region merging on at least one unit block, and N is an integer greater than or equal to 1; determining to-be-placed application icons in the N icon regions; and filling the application icons in the N icon regions based on the to-be-placed application icons to generate a target desktop layout.

16 Claims, 10 Drawing Sheets

When a desktop of an electronic device is in a desktop layout setting state, determine N icon regions on a desktop page of the electronic device according to a region selection input of a user — 101

Determine to-be-placed application icons in the N icon regions — 102

Fill the application icons in the N icon regions based on the to-be-placed application icons to generate a target desktop layout — 103

DESKTOP LAYOUT METHOD AND APPARATUS, AND ELECTRONIC DEVICE

CROSS-REFERENCE TO RELATED APPLICATIONS

This application is continuation application of PCT International Application No. PCT/CN2021/119285 filed on Sep. 18, 2021, which claims priority to Chinese Patent Application No. 202011025778.X, filed on Sep. 25, 2020 in China, which are incorporated in their entireties by reference herein.

TECHNICAL FIELD

This application pertains to the field of communications technologies, and specifically relates to a desktop layout method and apparatus, and an electronic device.

BACKGROUND

Currently, sizes of application icons on a desktop of an electronic device are the same, and the application icons are distributed at equal intervals in a block shape, and are presented as a square-like desktop layout. When customizing the desktop, a user can perform only a simple setting based on an original square-like layout. For example, quantities of arrangement rows and columns of application icons on the desktop are changed, for example, 4×6 (6 rows and 4 columns) is changed to 5×5 or 5×6, a desktop skin is changed, and a desktop page is deleted or added, but the square-like layout cannot be changed.

It can be learned that an existing desktop layout manner is relatively single, and consequently a degree of freedom of a desktop layout is relatively small, and it is difficult to meet the user's diversified and personalized desktop layout requirements.

SUMMARY

According to a first aspect, an embodiment of this application provides a desktop layout method, and the method includes:

when a desktop of an electronic device is in a desktop layout setting state, determining N icon regions on a desktop page of the electronic device according to a region selection input of a user, where each icon region is obtained by performing region merging on at least one unit block, and N is an integer greater than or equal to 1;

determining to-be-placed application icons in the N icon regions; and filling the application icons in the N icon regions based on the to-be-placed application icons to generate a target desktop layout.

According to a second aspect, an embodiment of this application provides a desktop layout apparatus, including:

a first determining module, configured to: when a desktop of an electronic device is in a desktop layout setting state, determine N icon regions on a desktop page of the electronic device according to a region selection input of a user, where each icon region is obtained by performing region merging on at least one unit block, and N is an integer greater than or equal to 1;

a second determining module, configured to determine to-be-placed application icons in the N icon regions; and a filling module, configured to fill the application icons in the N icon regions based on the to-be-placed application icons to generate a target desktop layout.

According to a third aspect, an embodiment of this application provides an electronic device. The electronic device includes a processor, a memory, and a program or an instruction that is stored in the memory and that can be run on the processor, where when the program or the instruction is executed by the processor, the steps of the method in the first aspect are implemented.

According to a fourth aspect, an embodiment of this application provides a readable storage medium. The readable storage medium stores a program or an instruction, and when the program or the instruction is executed by a processor, the steps of the method in the first aspect are implemented.

According to a fifth aspect, an embodiment of this application provides a chip. The chip includes a processor and a communications interface, the communications interface is coupled to the processor, and the processor is configured to run a program or an instruction to implement the method in the first aspect.

According to a sixth aspect, an embodiment of this application provides a computer program product, stored in a readable storage medium, where the computer program product is executed by at least one processor to implement the method in the first aspect.

According to a seventh aspect, an embodiment of this application provides a desktop layout apparatus, configured to perform the method in the fifth aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a desktop layout method provided in the embodiments of this application is described in detail by using specific embodiments and application scenarios.

Figure 1:
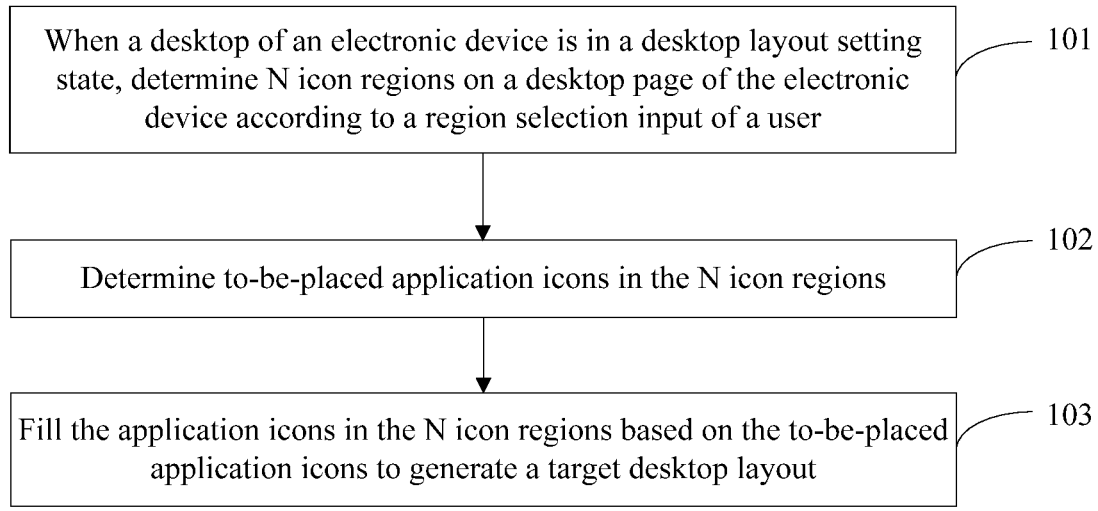
FIG. 1 is a flowchart of a desktop layout method according to an embodiment of this application.

Referring to FIG. 1, FIG. 1 is a flowchart of a desktop layout method according to an embodiment of this application. As shown in FIG. 1, the method includes the following steps:

Step 101: When a desktop of an electronic device is in a desktop layout setting state, determine N icon regions on a desktop page of the electronic device according to a region selection input of a user, where each icon region is obtained by performing region merging on at least one unit block, and N is an integer greater than or equal to 1.

The desktop layout setting state may be a state in which a desktop layout may be set. Specifically, the desktop layout setting state may be entered through a trigger operation of the user.

That is, before step 101, the method may further include: in a case that a first preset input is received, entering, by the electronic device, the desktop layout setting state, where when the desktop of the electronic device is in the desktop layout setting state, M unit blocks in a selectable state are displayed on the desktop page, and M is an integer greater than 1.

The first preset input may be a preset input that is used to trigger entering of the desktop layout setting state, for example, may be a double-finger upward sliding input or an input on a control on the desktop.

After the electronic device enters the desktop layout setting state, the M unit blocks in a selectable state may be displayed on the desktop page of the electronic device. Specifically, when the electronic device enters the desktop layout setting state, a quantity of original desktop pages may be kept unchanged, a blank desktop page is created, and the M unit blocks are displayed on the blank desktop page. An icon placement region on the blank desktop page may be evenly segmented by the M unit blocks, so that the user selects several unit blocks, and perform region merging on the selected unit blocks to obtain an icon region of a desired size. A unit block may be used as a minimum unit identifier for segmenting the desktop page, and a size of the unit block may be consistent with a size of a desktop icon in an existing square-like desktop layout.

Figure 2:
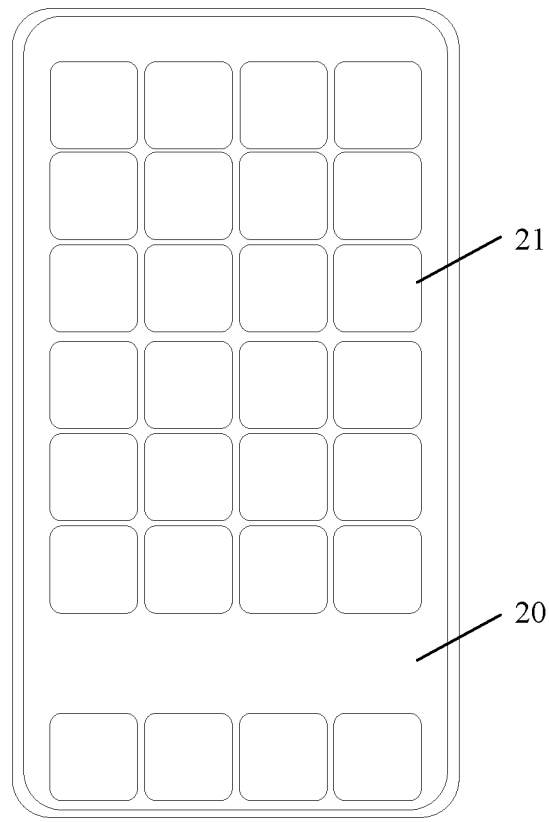
FIG. 2 is a schematic diagram of entering a desktop layout setting state according to an embodiment of this application.

For example, after entering the desktop layout setting state, the electronic device may generate a new desktop page. As shown in FIG. 2, a plurality of evenly distributed unit blocks 21 are displayed on the newly generated desktop page 20, and these unit blocks are in a selectable state. An original form may be maintained for several fixed application icon regions at the bottom of the desktop, that is, application icons are displayed, and cannot be selected. Certainly, a fixed icon region at the bottom may be set to a unit block in a selectable state as required.

In this way, the M unit blocks in a selectable state are displayed on the desktop page in the desktop layout setting state, so that the user selects a desired unit block for region merging as required, to obtain an icon region of a custom size.

After the electronic device enters the desktop layout setting state, the user may perform the region selection input on the desktop page, that is, select a unit block region that needs to be merged from the desktop page. Specifically, the desktop page may be divided into a plurality of unit block regions, and the user may select at least one unit block region for merging. The region selection input may be a tap input, a press input, or the like to a specified unit block region, or may be a sliding input along boundaries of one or more unit block region on the desktop page, and a region circled by a slide track is a selected unit block region. For example, the user may perform sliding on boundaries of two adjacent unit block regions, and a region circled by a slide track of the user includes the two adjacent unit block regions, so that the two adjacent unit block regions are selected. The selected unit block region may present a selected effect, for example, color deepening or being displayed in a specific color.

After the user selects a unit block region, the selected unit block region may be merged based on the selected unit block region to obtain a corresponding icon region. Specifically, a rectangular region including the selected unit block region may be determined as the corresponding icon region according to a location of the selected unit block region. When the selected unit block region is merged to form a regular rectangular region, the rectangular region may be directly determined as the corresponding icon region. When the selected unit block region is merged to form an irregular region, the missing unit block region may be filled until a regular rectangular region is formed, and the rectangular region is determined as the corresponding icon region. Alternatively, a boundary of a unit block region at the outermost side may be determined as a boundary of the rectangular region according to the selected unit block region, and the rectangular region including the boundary is determined as the corresponding icon region.

In this embodiment of this application, the user may determine only one icon region on the desktop page, or may successively determine a plurality of icon regions on the desktop page in the foregoing same manner, where sizes of the plurality of icon regions may be different, that is, irregular arrangement may be presented on the desktop page.

Optionally, the determining N icon regions on a desktop page of the electronic device according to a region selection input of a user includes:

receiving a selection input of the user on M unit blocks; and determining a corresponding target icon region based on selected unit blocks, where the target icon region is any icon region in the N icon regions.

In this implementation, after entering the desktop layout setting state, the user may perform the selection input on the M unit blocks, that is, the user may select a required unit block from the M unit blocks. The selection input may be a tap input, a press input, or the like. For example, the user may tap any unit block in the M unit blocks, and may successively tap a plurality of unit blocks. The tapped unit block is a selected unit block, and the selected unit block may present a selected effect, for example, color deepening or being displayed in a specific color.

After the user selects unit blocks, the selected unit blocks may be merged, that is, regions in which the selected unit blocks are located are merged into a large icon region, and all selected unit blocks are located in the merged icon region. In this way, one icon region obtained by merging regions of selected unit blocks may be determined based on the selected unit blocks. The user may select one unit block from the M unit blocks, or may select a plurality of unit blocks. When only one unit block is selected, a corresponding icon region is a region of the unit block. When a plurality of unit blocks are selected, a corresponding icon region may be obtained by merging regions of the plurality of unit blocks.

It should be noted that when selecting unit blocks, the user may successively select, based on a location and a size of a desired icon region, each unit block in the icon region from the M unit blocks, or may select only two or more unit blocks that are in the icon region and that are located in a diagonal direction.

It should be further noted that, after selecting unit blocks, the user may trigger region merging through a trigger input. For example, the user may perform a long-press input on any selected unit block, or tap a blank space on the desktop page to trigger region merging.

In this way, the user may select an expected unit block from the M unit blocks for merging to obtain the corresponding target icon region. In this implementation, operations are easy to implement, and an icon region of a desired size can be obtained by merging a selected unit block.

Further, the determining a corresponding target icon region based on selected unit blocks includes:

determining four boundaries based on the selected unit blocks, where each boundary overlaps with a boundary of at least one unit block in the selected unit blocks; and determining a rectangular region consisting of the four boundaries as the corresponding target icon region, where all selected unit blocks are located in the target icon region.

That is, in this implementation, a left boundary of a leftmost unit block in the selected unit blocks may be used as a left boundary of the to-be-determined target icon region, a right boundary of a rightmost unit block in the selected unit blocks is used as a right boundary of the to-be-determined target icon region, an upper boundary of an uppermost unit block in the selected unit blocks is used as an upper boundary of the to-be-determined target icon region, and a lower boundary of a lowermost unit block in the selected unit blocks is used as a lower boundary of the to-be-determined target icon region, to obtain four boundaries, that is, the upper boundary, the lower boundary, the left boundary, and the right boundary, of the target icon region.

The rectangular region formed by the four boundaries is the target icon region corresponding to the selected unit blocks. In this way, each boundary of the obtained target icon region overlaps with the boundary of the at least one unit block in the selected unit blocks, and all the selected unit blocks are located in the target icon region.

Figure 3A:
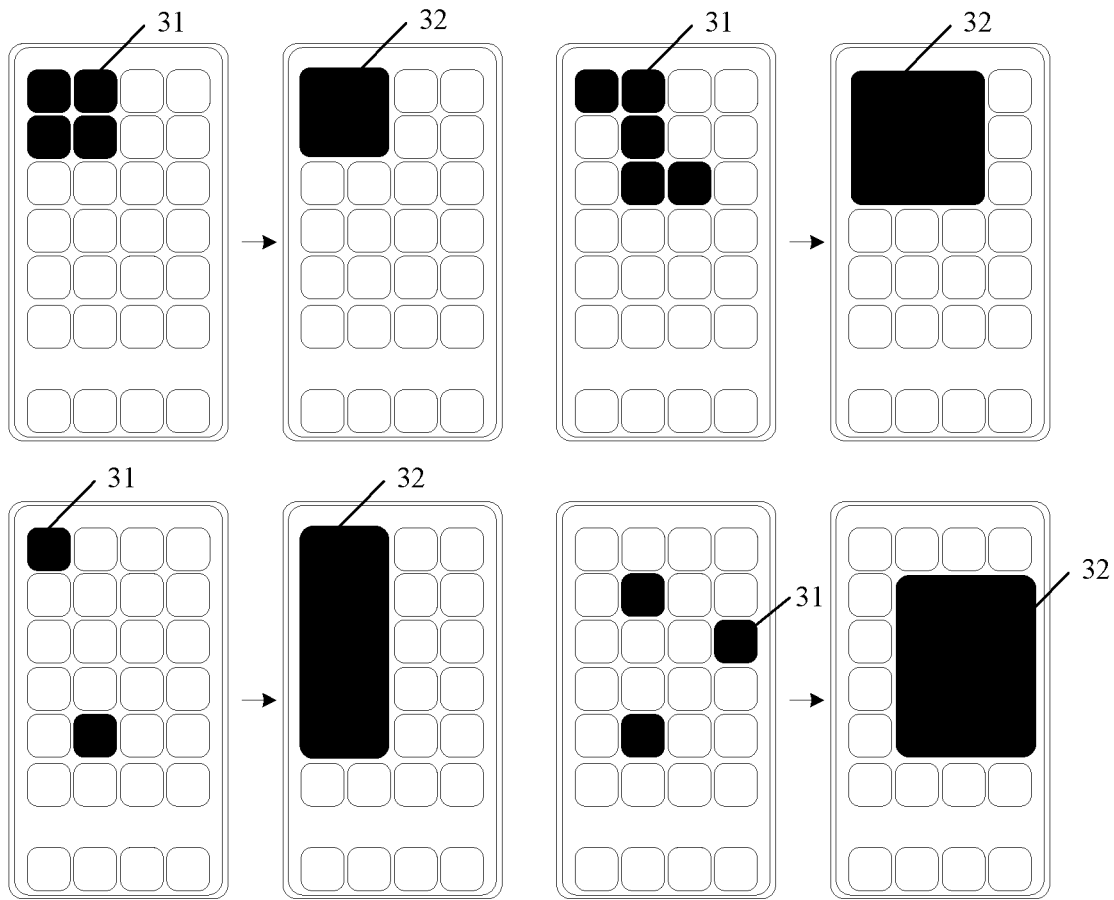
FIG. 3*a* is a schematic diagram of determining a merged region according to a selected unit block according to an embodiment of this application.

For example, as shown in FIG. 3a, several schematic diagrams of target icon regions obtained by merging unit blocks at different locations are provided. It can be seen from the figure, a largest merged region is separately determined by using the leftmost, rightmost, topmost, and bottommost of selected unit blocks 31 as boundaries to obtain a corresponding target icon region 32.

In this way, a corresponding target icon region including selected unit blocks may be quickly determined based on the selected unit blocks. In this implementation, the user only needs to select several unit blocks in an expected icon region, and does not need to select all unit blocks in the icon region.

Optionally, after the determining a corresponding target icon region based on selected unit blocks, the method further includes:

receiving a preset touch input on the target icon region, where the target icon region includes at least two unit blocks; and dissolving the target icon region in response to the preset touch input.

Figure 3B:
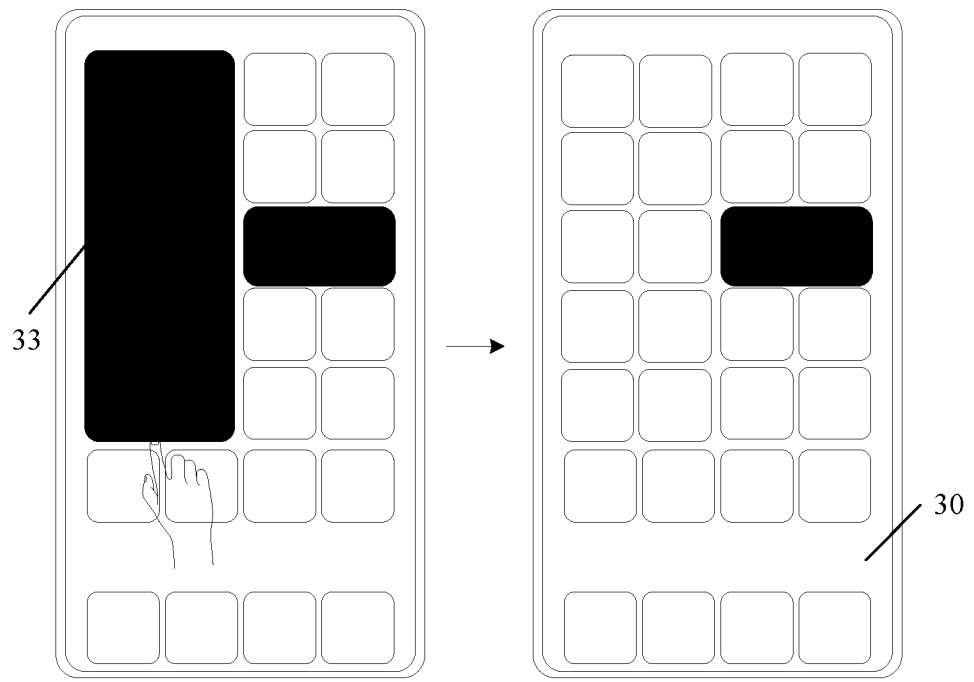
FIG. 3*b* is a schematic diagram of an operation of dissolving a merged region according to an embodiment of this application.

That is, after merging a plurality of selected unit blocks to obtain the target icon region, the user may further dissolve the region through the preset touch input on the target icon region, where the preset touch input may a double-tap input, a press input, or the like, and the dissolving the target icon region may be restoring the target icon region to a previous style before the merging, that is, to display the plurality of unit blocks. For example, as shown in FIG. 3b, when an input performed by the user to perform a double-tap on a target icon region 33 is received, the target icon region 33 may be dissolved. The dissolved desktop page 30 is shown on the right side in the figure.

In this way, when the merged icon region is not expected by the user, the region may be quickly dissolved through the preset touch input on the icon region.

Step 102: Determine to-be-placed application icons in the N icon regions.

After the N icon regions are determined, the to-be-placed application icons in the N icon regions may be further determined, that is, determine which application icon is placed in each icon region. This may be specifically determined in two different manners. In one manner, a to-be-placed application icon may be determined automatically by a system, to implement intelligent filling in the N icon regions. In the other manner, a to-be-placed application icon may be determined by the user, that is, the user may select the to-be-placed application icon in each icon region.

In an implementation, step 102 includes:

receiving a second preset input of the user;

in response to the second preset input, determining a score of each icon region in the N icon regions, and obtaining a usage parameter of an application corresponding to each application icon on the desktop; and determining a to-be-placed application icon in each icon region based on the score of each icon region and the usage parameter of the application corresponding to each application icon on the desktop.

That is, after the N icon regions are determined, if the user needs to intelligently fill a desktop layout, the second preset input may be performed to trigger the electronic device to intelligently fill application icons in the N icon regions, where the second preset input may be shaking the electronic device, touching a control used for intelligent filling on the touch desktop page, or the like.

A rule for the intelligent filling may be determining the to-be-placed application icon in each icon region based on the score of each icon region in the N icon regions and the usage parameter of the application corresponding to each application icon on the desktop. For example, an application icon of an application that is used frequently may be placed in an icon region with a higher score, and an application icon of an application that is not often used is placed in an icon region with a lower score.

A score of each icon region may be determined according to a location in which each icon region is located, a region size, and the like. For example, scores of different locations and different region area sizes may be set, for example, a score of an upper location or a middle location is high, or a score of a large region area is high. A specific rule may be set according to an actual requirement. The usage parameter may be usage duration, usage frequency, or the like. For example, a usage parameter of an application corresponding to each application icon is determined by counting a quantity of times or duration that the application is started in one week.

Figure 4:
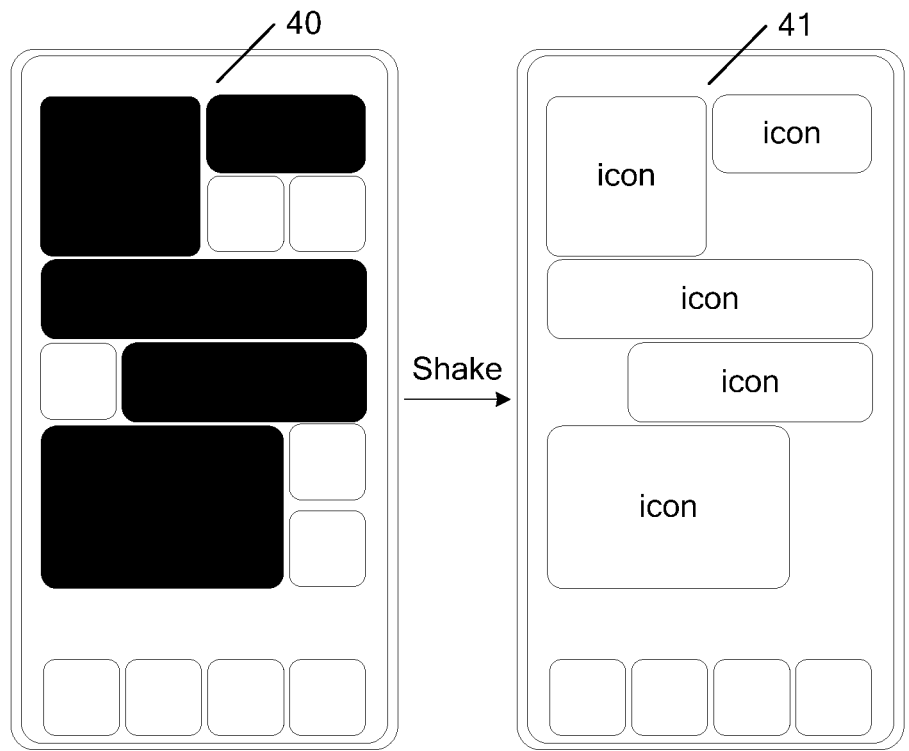
FIG. 4 is a schematic diagram of intelligently filling an icon in each icon region according to an embodiment of this application.

For example, as shown in FIG. 4, after several icon regions are determined on a desktop page 40, the user may implement intelligent filling by shaking the electronic device. A desktop layout 41 after the intelligent filling is shown on the right side in the figure, and regions marked with black in the figure are several icon regions determined by the user, where icon in the figure indicates that an icon is placed.

In this way, the user may trigger, through the second preset input, to intelligently fill icons in the N icon regions, so that an application icon that needs to be placed in each icon region does not need to be manually selected by the user, thereby improving desktop layout efficiency. In addition, when intelligent filling is performed in the N icon regions, the to-be-placed application icon in each icon region is determined based on the score of each icon region in the N icon regions and the usage parameter of the application corresponding to each application icon on the desktop, thereby providing a practical and feasible intelligent filling icon rule.

Optionally, the usage parameter is usage frequency; and the determining a to-be-placed application icon in each icon region based on the score of each icon region and the usage parameter of the application corresponding to each application icon on the desktop includes:

determining the to-be-placed application icon in each icon region based on the score of each icon region and usage frequency of each application icon on the desktop and according to a rule that an application icon of an application with high usage frequency is placed in an icon region with a high score.

In this implementation, the usage parameter may be usage frequency. Specifically, usage frequency of each application icon on the desktop may be determined by counting a quantity of times of using each application icon in a fixed period. Therefore, when intelligent filling needs to be performed, the to-be-placed application icon in each icon region may be determined based on scores of the N icon regions and the usage frequency of each application icon on the desktop. A specific rule is determining the to-be-placed application icon in each icon region according to a usage frequency of each application icon and a score of each icon region. That is, an application icon of an application with high usage frequency is placed in an icon region with a high score, and an application icon of an application with low usage frequency is placed in an icon region with a low score.

For example, if a score of an icon region 1 is greater than a score of an icon region 2, the score of the icon region 2 is greater than a score of an icon region 3, usage frequency of an application 1 is higher than usage frequency of an application 2, and the usage frequency of the application 2 is higher than usage frequency of an application 3, an icon of the application 1 may be placed in the icon region 1, an icon of the application 2 is placed in the icon region 2, and an icon of the application 3 is placed in the icon region 3.

In this way, the to-be-placed application icon in each icon region is determined according to the rule that an application icon of an application with high usage frequency is placed in an icon region with a high score, so that intelligent filling can be performed based on a usage habit of the user, thereby ensuring that a finally generated desktop layout meets an operation habit of the user.

Optionally, the determining a score of each icon region in the N icon regions includes:

determining a first location score of the corresponding icon region based on a location of an upper boundary of each icon region;

determining an area score of the corresponding icon region based on a quantity of unit blocks included in each icon region; and determining a sum of the first location score and the area score of each icon region as a total score of the corresponding icon region.

That is, in this implementation, the location score and the area score of each icon region may be separately calculated based on a location and an area size of each icon region, the sum of the two is used as the total score of each icon region, and further the to-be-placed application icon in each icon region is determined according to the total score of each icon region.

Figure 5A:
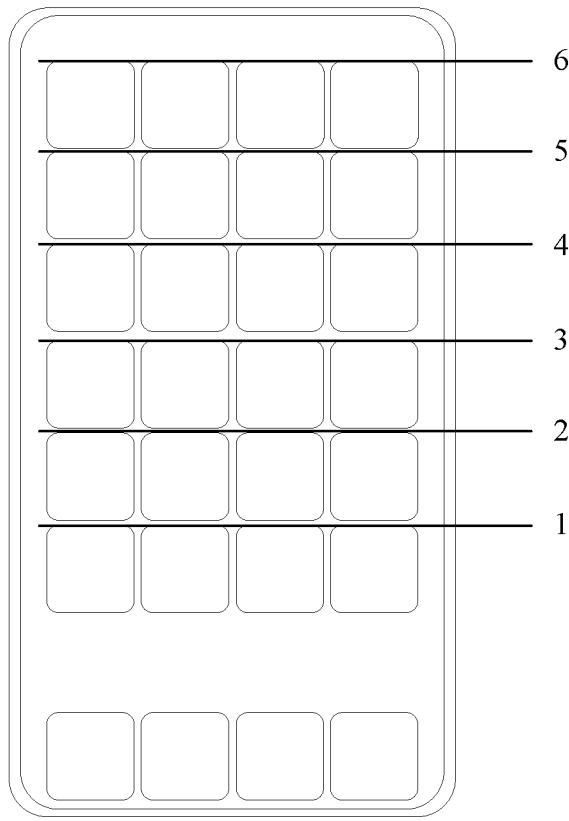
FIG. 5*a* is a schematic diagram of defining scores of different boundaries according to an embodiment of this application.
Figure 5B:
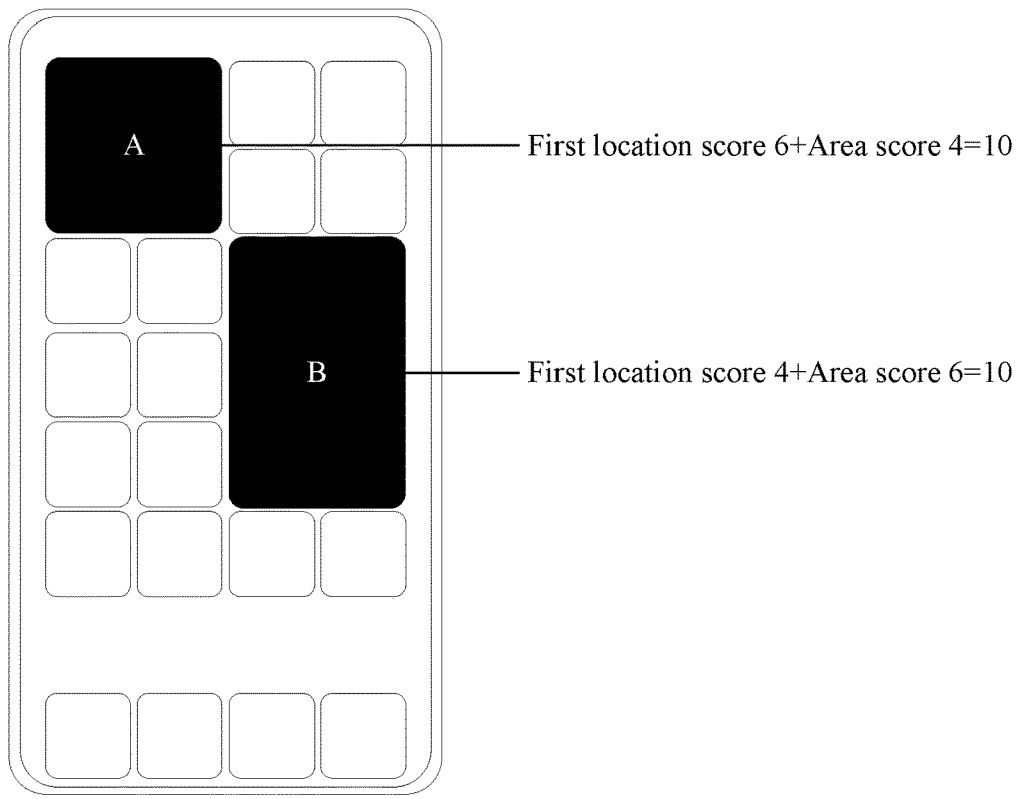
FIG. 5*b* is a first schematic diagram of calculating a score of each icon region according to an embodiment of this application.

Specifically, for calculation of a location score, a score of each boundary on the desktop page may be predefined, and then the location score of each icon region is determined according to a score corresponding to the upper boundary of each icon region, and the score may be denoted as the first location score. For example, as shown in FIG. 5*a*, 6 points are denoted for a horizontal line on which an upper boundary of a unit block in a first row is located, 5 points are denoted for a horizontal line on which an upper boundary of a unit block in a second row is located, 4 points are denoted for a horizontal line on which an upper boundary of a unit block in a third row is located, and by analogy. As shown in FIG. 5*b*, an upper boundary of an icon region A is located in the first row, and therefore a location score of the icon region A is 6; and an upper boundary of an icon region B is located in the third row, and therefore a location score of the icon region B is 4.

For calculation of an area score, a target score may be defined for one unit block in each icon region. Therefore, an area score of each icon region may be equal to multiplying a quantity of unit blocks included in the icon region by the target score. For example, 1 point is denoted for each unit block, and an area score is denoted based on a quantity of unit blocks in one icon region. Therefore, as shown in FIG. 5b, the icon region A includes four unit blocks, and therefore, an area score of the icon region A may be 4; and the icon region B includes six unit blocks, and therefore an area score of the icon region B may be 6.

When determining the sum of the first location score and the area score of each icon region, the sum of the first location score and the area score of each icon region may be determined as the total score of the icon region. For example, as shown in FIG. 5b, the location score of the icon region A is 6, the area score is 4, and therefore a total score of the icon region A is 10; and the location score of the icon region B is 4, the area score is 6, and therefore a total score of the icon region B is also 10.

In this way, a score calculation manner in this implementation is simple and easy to implement, so that a score of each icon region can be quickly determined, and a calculation result can accurately reflect importance of each icon region.

Optionally, the determining a to-be-placed application icon in each icon region based on the score of each icon region and the usage parameter of the application corresponding to each application icon on the desktop includes:

for icon regions whose total scores are different in the N icon regions, determining the to-be-placed application icon in the corresponding icon region according to the total score of each icon region and the usage parameter of the application corresponding to each application icon on the desktop;

for icon regions whose total scores are the same in the N icon regions, determining the to-be-placed application icon in the corresponding icon region according to the first location score of each icon region and the usage parameter of the application corresponding to each application icon on the desktop; and for icon regions whose total scores and first location scores are the same in the N icon regions, determining the to-be-placed application icon in the corresponding icon region according to a second location score of each icon region and the usage parameter of the application corresponding to each application icon on the desktop, where the second location score of the icon region is determined based on a location of a lower boundary of the icon region.

When the to-be-placed application icon in each icon is determined according to the scores of the N icon regions, scores of a plurality of icon regions may be the same, and consequently placement in which icon region is preferential cannot be determined. In view of this, this implementation provides a solution.

Specifically, for icon regions whose total scores are different in the N icon regions, the to-be-placed application icon in the corresponding icon region is determined according to the total score of each icon region and the usage parameter of the application corresponding to each application icon on the desktop, that is, an application icon of an application that is used frequently is preferentially placed for a high total score.

For icon regions whose total scores are the same in the N icon regions, the to-be-placed application icon in the corresponding icon region is determined according to the first location score of each icon region and the usage parameter of the application corresponding to each application icon on the desktop, that is, placement in an icon region with a high first location score in the icon regions whose total scores are the same is preferential. For example, as shown in FIG. 5b, both the total score of the icon region A and the total score of the icon region B are 10, but the first location score of the icon region A is higher than the first location score of the icon region B. Therefore, the icon region A has precedence over the icon region B, and an application icon of an application whose usage frequency is slightly high is placed in the icon region A. Certainly, in this case, it may be specified that placement for a high area score is preferential according to a user requirement.

For icon regions whose total scores and first location scores are the same in the N icon regions, the second location score of each icon region may be further determined, and the to-be-placed application icon in the corresponding icon region is determined according to the second location score of each icon region and the usage parameter of the application corresponding to each application icon on the desktop. That is, in the icon regions whose total scores and first location scores are the same, placement in an icon region with a high second location score is preferential. The second location score may be determined based on the location in which the lower boundary of the icon region is located.

Figure 5C:
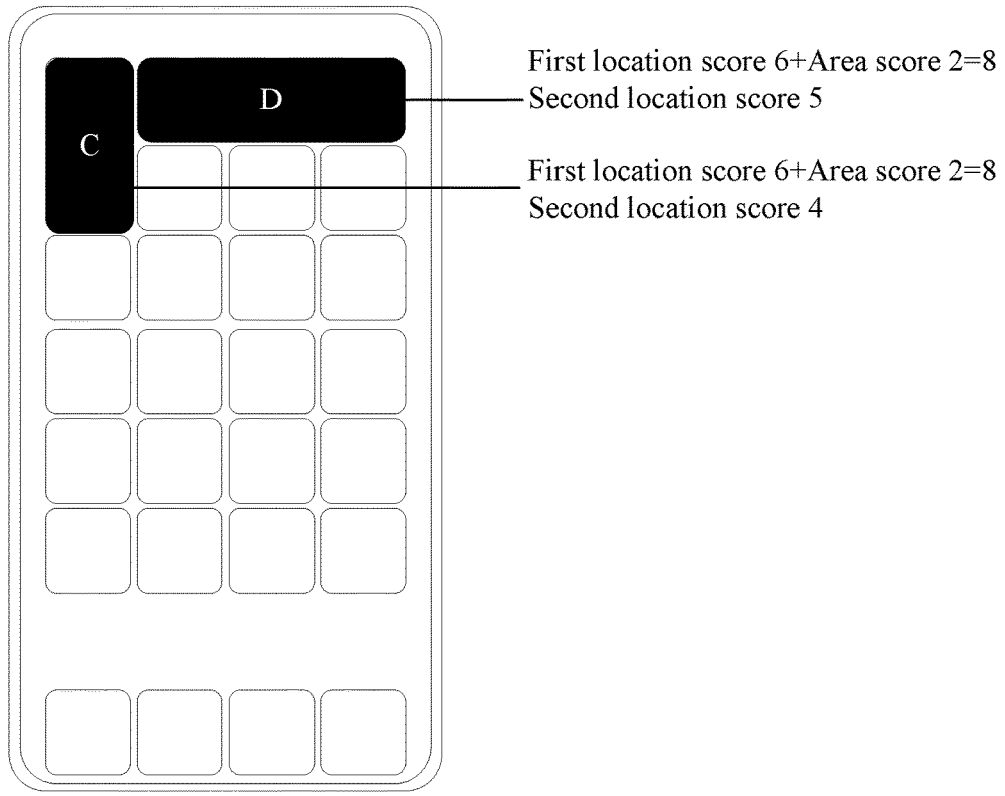
FIG. 5*c* is a second schematic diagram of calculating a score of each icon region according to an embodiment of this application.

For example, as shown in FIG. 5c, both an upper boundary of an icon region C and an upper boundary of an icon region D are located in a first row, and a first location score of each of the two may be 6, and each of the icon region C and the icon region D includes two unit blocks. Therefore, an area score of each of the two is 2. Therefore, not only first location scores of the icon region C and the icon region D are the same, but also total scores thereof are the same and are 8. In this case, a preferential region may be determined based on scores corresponding to a lower boundary of the icon region C and a lower boundary of the icon region D. It can be seen from the figure that the lower boundary of the icon region C is located in a third row, a second location score thereof may be 4; and the lower boundary of the icon region D is located in a second row, and a second location score thereof may be 5. Therefore, the icon region D has precedence over the icon region C, and an application icon of an application whose usage frequency is slightly high is placed in the icon region D.

It should be noted that, an occurrence probability of a case that second location scores are also the same is less. In this case, placement in which icon region is preferential may be randomly determined, and a final desktop layout result is not greatly affected.

In this way, in this implementation, an effective and feasible solution for determining a to-be-placed application is provided for icon regions with a same score.

In another implementation, step 102 includes:

determining the to-be-placed application icons in the N icon regions based on an icon selection input of the user on an icon region in the N icon regions.

That is, after the N icon regions are determined, the user may fully customize the to-be-placed application icon in each icon region, that is, may select the to-be-placed application icon in each icon region one by one.

Figure 6A:
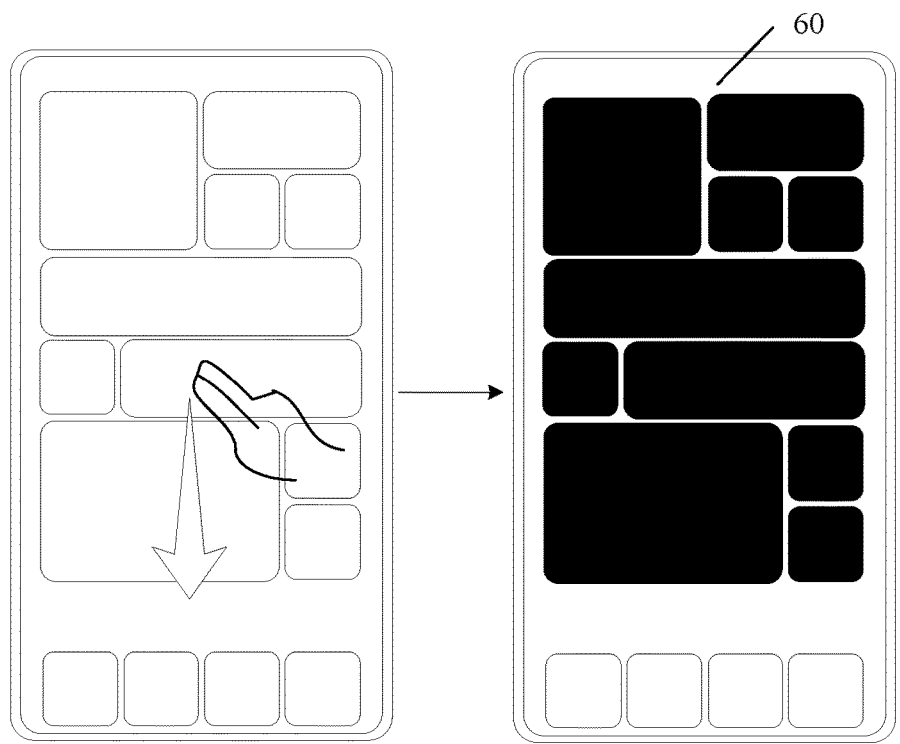
FIG. 6*a* is a schematic diagram of exiting a region layout design according to an embodiment of this application.

Specifically, after the icon regions are determined, the user may perform a specific input to exit a region layout design, to enter a next step of selecting the to-be-placed application icon in each icon region by the user. For example, as shown in FIG. 6a, the user may perform a double-finger downward sliding input, to exit the region layout design, and generate a desktop page 60 shown on the right side in the figure, so as to form an independent icon region by using remaining unit blocks that the user does not select for merging. Then, the user may perform the icon selection input on each icon region in the N icon regions, to select the to-be-placed application icon in each icon region, so that the electronic device can determine the to-be-placed application icons in the N icon regions based on user selection.

It should be noted that the user may select the to-be-placed application icon for each icon region on the current desktop page, or may select a to-be-placed application icon for only a part of icon regions, and may not place an application icon for an icon region whose application icon is not selected.

In this way, the user can also set, according to a requirement of the user, an application placed in each icon region, to generate a desktop layout that the user likes, and the novel and unique desktop layout manner can further improve user experience.

Further, the determining the to-be-placed application icons in the N icon regions based on an icon selection input of the user on an icon region in the N icon regions includes:

receiving a touch input of the user on a first icon region in the N icon regions;

in response to the touch input, displaying Q to-be-selected application icons in a target region associated with the first icon region, where Q is a positive integer;

receiving a selection input of the user on a target application icon in the Q to-be-selected application icons; and in response to the selection input, determining the target application icon as a to-be-placed application icon in the first icon region, where the first icon region is any icon region in the N icon regions.

That is, in this implementation, when the user wants to select an application icon for an icon region, the user may perform a touch input on the icon region, for example, perform a long-press operation on the icon region. After receiving the touch input, the electronic device may display a to-be-selected application icon in a target region associated with the icon region, so that the user selects a to-be-placed application icon. The target region associated with the icon region may be a region near the icon region. For example, an application icon display region pops up below the icon region.

Then, the user may select, from a plurality of to-be-placed application icons displayed in the target region, a target application icon that is expected to be placed, for example, tap the target application icon, so that the electronic device can determine the target application icon as the to-be-placed application icon in the icon region, and after the user completes selection of an application icon in a specific icon region, fill the application icon in the icon region.

After the user completes selection of an application icon in one icon region, the same operation may be repeated, and application icon selection is continued for a next icon region until application icon selection is completed for each icon region in which the application icon is to be placed.

Figure 6B:
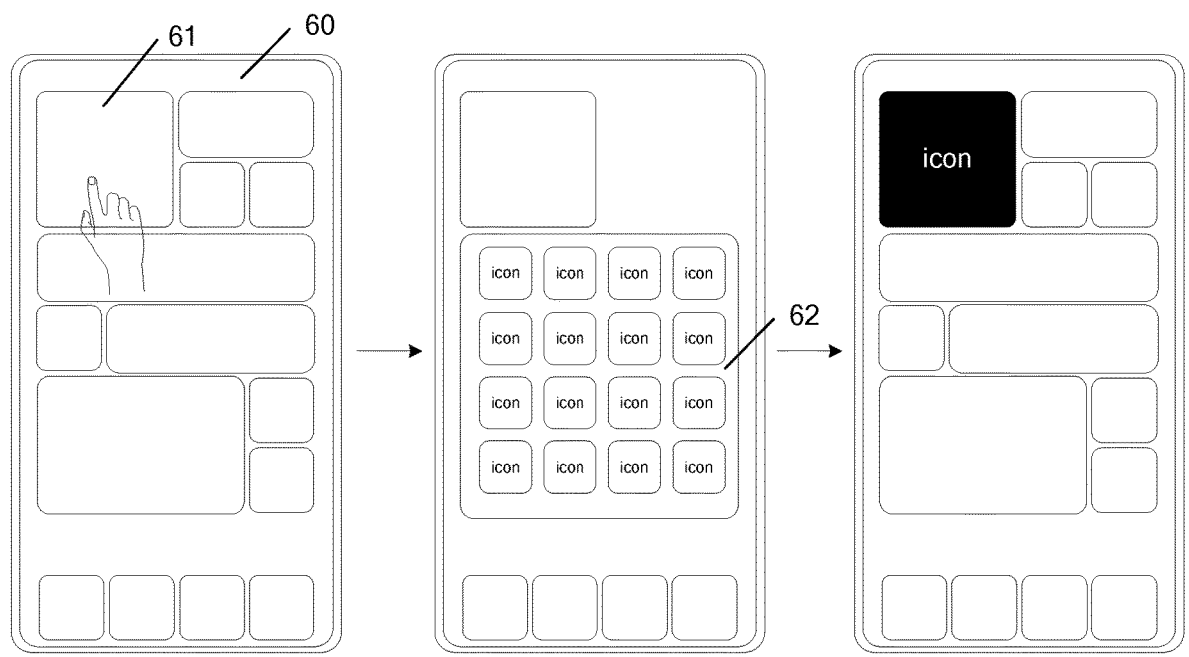
FIG. 6*b* is a schematic diagram of an operation of applying icon selection and filling to an icon region according to an embodiment of this application.

For example, as shown in FIG. 6b, the user may perform a long-press operation on an icon region 61 on a desktop page 60 for which a region layout has been completed, so that an icon selection region 62 is expanded below the icon region 61. The icon selection region 62 may display an application icon of an application currently installed on the electronic device. The user may select an application icon from the icon selection region 62, and place the application icon in the icon region 61. A size of the placed application icon is automatically adapted to the icon region 61.

In this way, the user may select, according to a requirement of the user, an application placed in each icon region, so that an expected application icon can be placed at an expected location to generate a desktop layout that the user likes.

Step 103: Fill the application icons in the N icon regions based on the to-be-placed application icons to generate a target desktop layout.

When the to-be-placed application icons in the N icon regions are determined, the determined application icons may be separately filled in corresponding icon regions, to complete user-defined desktop layout setting to obtain a personalized desktop layout. Because sizes of icon regions may be different, when the application icons are filled, sizes of the application icons may be automatically adapted to the icon regions, that is, a size of an application icon filled in each icon region is the same as a size of an icon region.

In addition, after the application icons are filled in the N icon regions, the user may exit desktop layout setting by performing a specific input. For example, the user may perform double-finger downward sliding on the desktop page, to complete a layout design of the entire desktop, exit the desktop layout setting state, and generate a new desktop page whose layout setting is customized by the user.

Figure 7A:
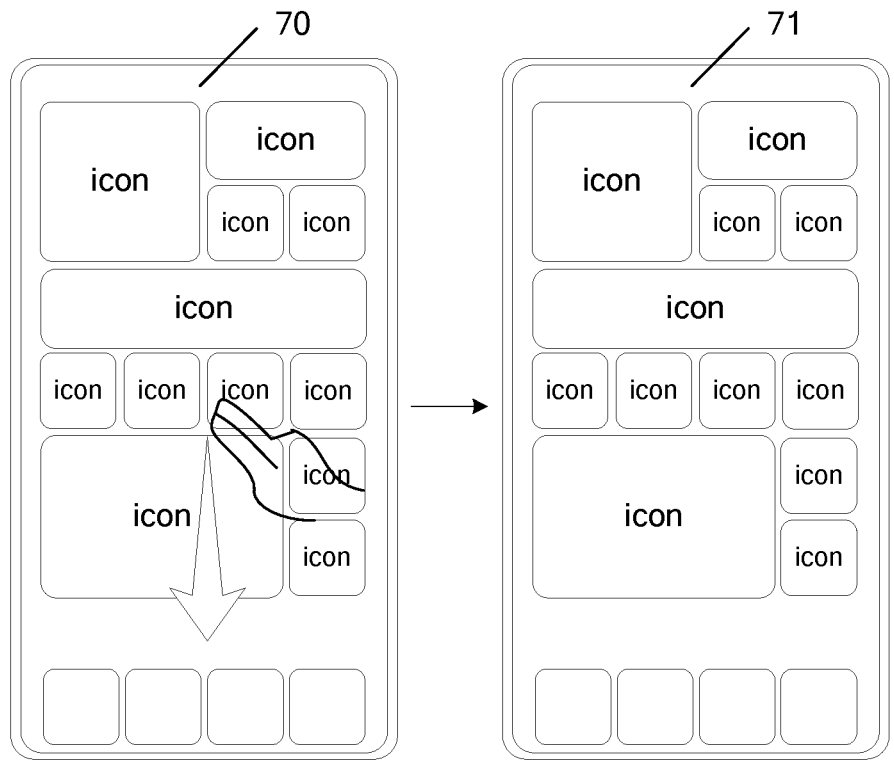
FIG. 7*a* is a schematic diagram of a desktop layout in which an application icon is placed in each icon region according to an embodiment of this application.
Figure 7B:
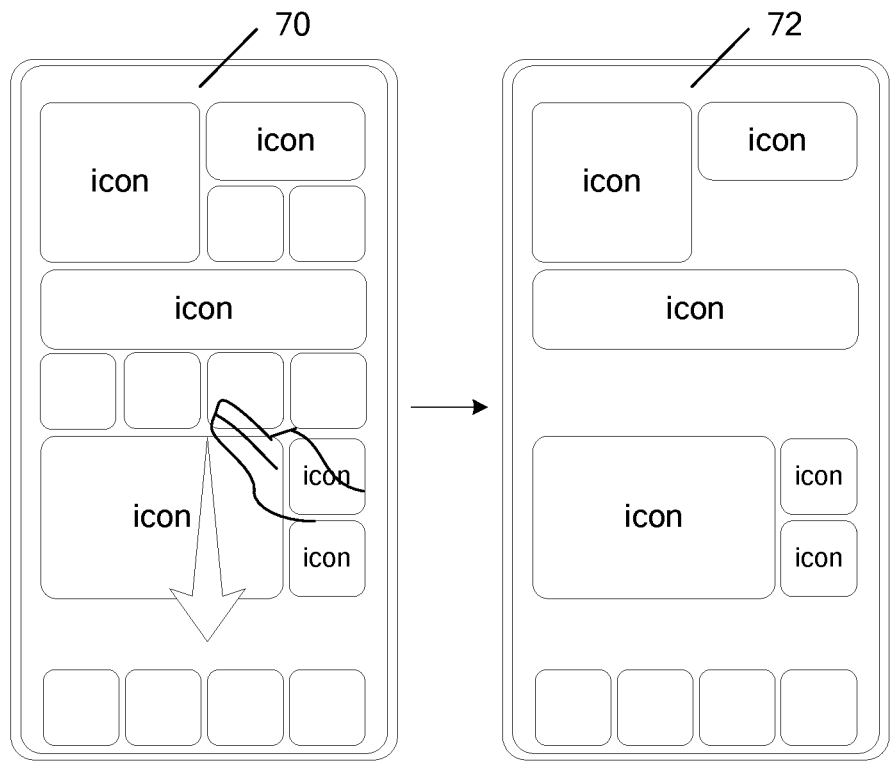
FIG. 7*b* is a schematic diagram of a desktop layout in which no application icon is placed in some icon regions according to an embodiment of this application.

It should be noted that, the user may fill an application icon in each icon region on the desktop page, or may fill application icons only in some icon regions and not place application icons in some icon regions. For example, as shown in FIG. 7a, the user places an application icon in each icon region, and after the user performs a double-finger downward sliding input on a desktop page 70, a desktop layout 71 in which an application icon is filled in each icon region shown on the right side in the figure is generated. As shown in FIG. 7b, the user places application icons only in some icon regions, and after the user performs a double-finger downward sliding input on the desktop page 70, a desktop layout 72 shown on the right side in the figure may be generated. It can be learned that an application icon is filled in only an icon region in which an application icon is placed, and an icon region in which no application icon is placed is blank.

Optionally, after step 103, the method further includes:

receiving a third preset input of the user on a target desktop page corresponding to the target desktop layout;

entering a desktop icon editing state in response to the third preset input, where the desktop icon editing state is a state in which an application icon in each icon region on the target desktop page may be replaced or deleted; and dissolving the target desktop layout in a case that a fourth preset input is received.

In this implementation, after the target desktop layout is generated, the user may also modify or dissolve the target desktop layout in a specific manner, so as to flexibly meet diversified requirements of the user.

Specifically, the user may perform the third preset input on the target desktop page corresponding to the target desktop layout, to enter the desktop icon editing state. In this state, the user can change or delete an application icon in each icon region on the target desktop page, where the third preset input may be a double-finger expansion input, a sliding input of a specific sliding track, or the like.

In the desktop icon editing state, the user may also continue to dissolve the target desktop layout through the fourth preset input, that is, restore icons on the desktop page to an original square-like layout, where the fourth preset input may be a double-finger expansion input, a touch operation on a control used to dissolve the desktop layout on the desktop page, or the like.

Figure 8:
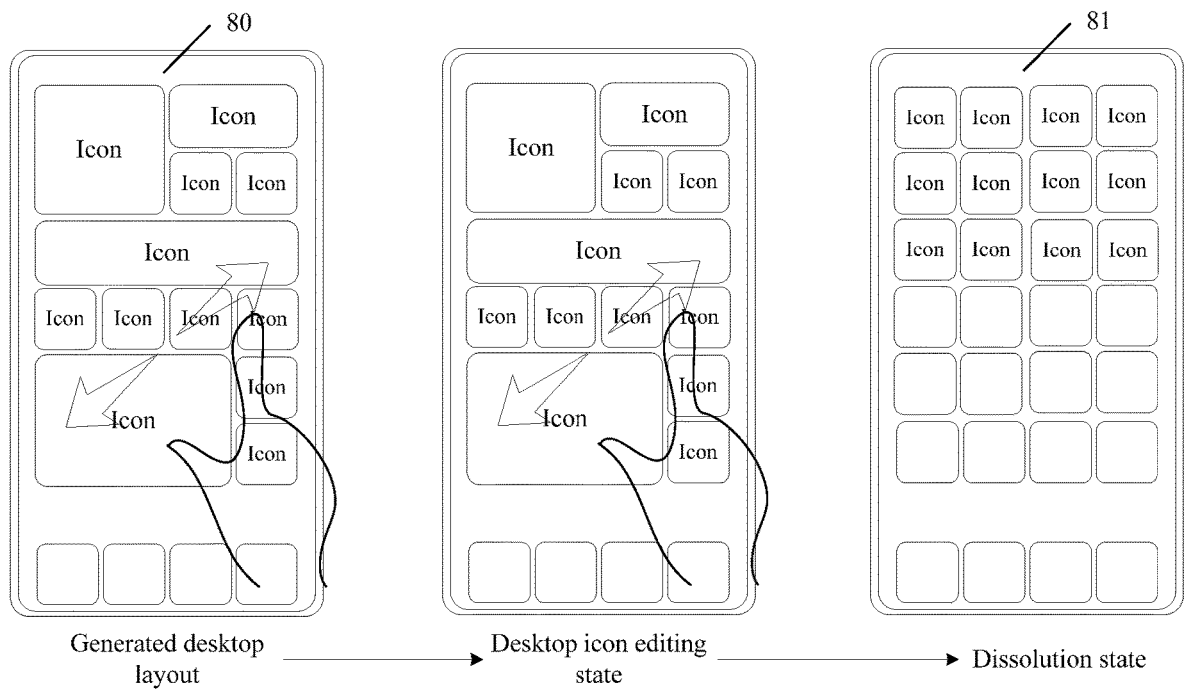
FIG. 8 is a schematic diagram of an operation of dissolving a generated desktop layout according to an embodiment of this application.

For example, as shown in FIG. 8, the user may perform a double-finger expansion input on a desktop page 80 to enter the desktop icon editing state. In this state, the user may modify or delete an application icon in any icon region, or perform a double-finger expansion input on the desktop page again, so that the current desktop layout can be rapidly dissolved. The dissolved desktop page 81 is shown on the right side in the figure.

In this way, the generated personalized desktop layout can be modified or dissolved by the user to meet diversified requirements of the user.

Optionally, after step 103, the method further includes:

in a case that an application corresponding to an application icon in a second icon region receives a notification message, displaying the notification message in the second icon region, where the second icon region is an icon region that is in the N icon regions and whose area is greater than a preset area threshold.

That is, for an icon region that occupies a relatively large area, a notification message of an application corresponding to an application icon in the icon region may be directly displayed in the icon region, so that the user can quickly read the notification message without entering an application interface.

Figure 9:
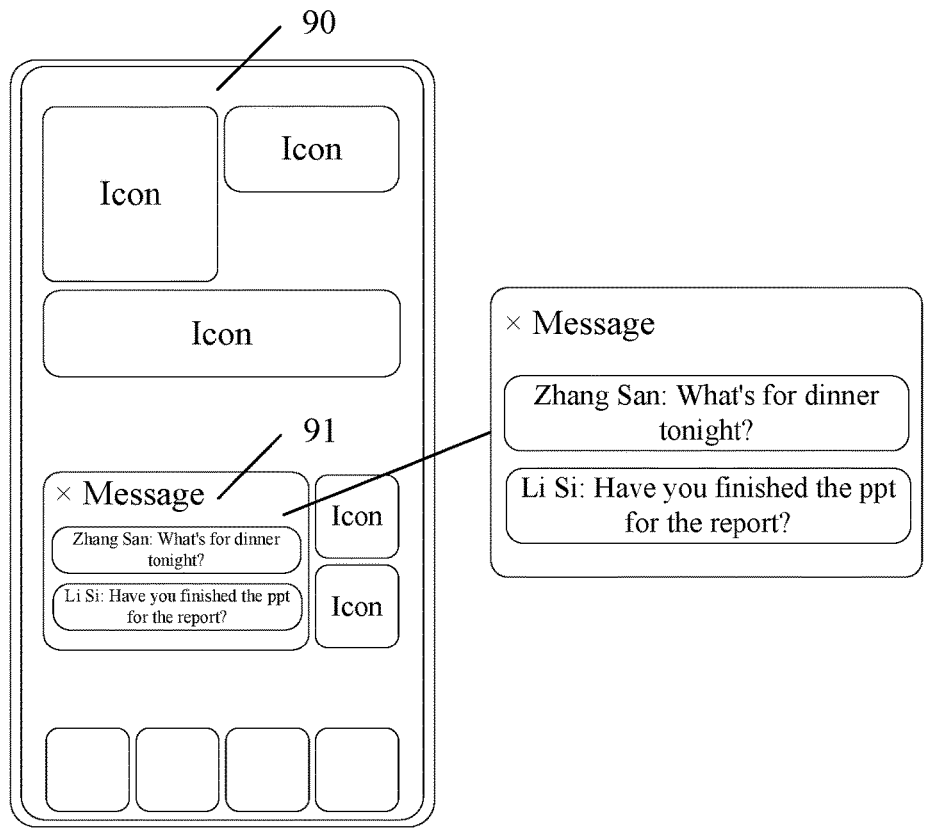
FIG. 9 is a schematic diagram of displaying an application notification message in an icon region with a relatively large area according to an embodiment of this application.

For example, as shown in FIG. 9, an application icon 91 on a desktop page 90 occupies a relatively large area, so that an application notification message can be directly displayed in an icon region.

In this way, a notification message of an application with a relatively large icon region is directly displayed in the icon region, so that the user can quickly read and process the notification message.

Optionally, after step 103, the method further includes:

in a case that an application icon is moved to the generated target desktop page in a first desktop page that uses an original desktop layout, filling, through automatic complement, a blank location after the application icon is removed for the first desktop page; and in a case that an application icon is moved to the generated target desktop page in a second desktop page that uses the target desktop layout, keeping a location of the removed application icon in the second desktop page blank.

Figure 10A:
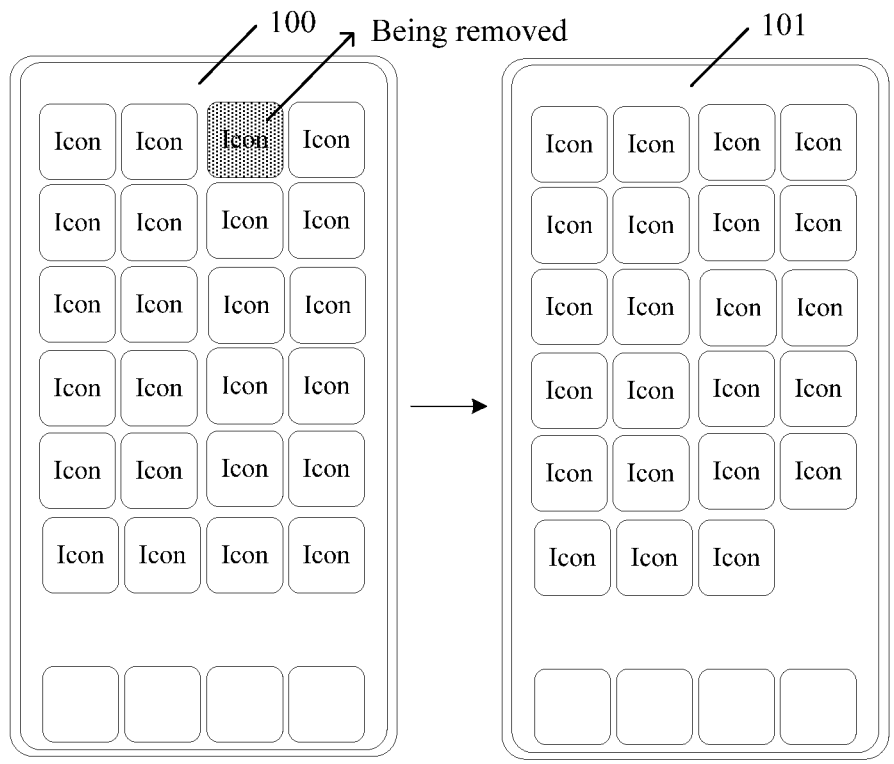
FIG. 10a is a schematic diagram of a page in which an icon is removed from an original desktop layout page according to an embodiment of this application.

When a new desktop page is generated in the layout, a location of an icon on an original desktop page is adjusted, that is, an original application icon on another desktop page is moved to the newly generated desktop page. In this way, for a desktop page that uses the original desktop layout, if an application icon is removed, a blank location after the application icon on the desktop page is removed may be filled through automatic complement, to keep desktop icons neatly placed. For example, as shown in FIG. 10a, after an application icon on a desktop page 100 is removed, an application icon behind the application icon is automatically filled forward, and a filled desktop page 101 is shown on the right side in the figure.

Figure 10B:
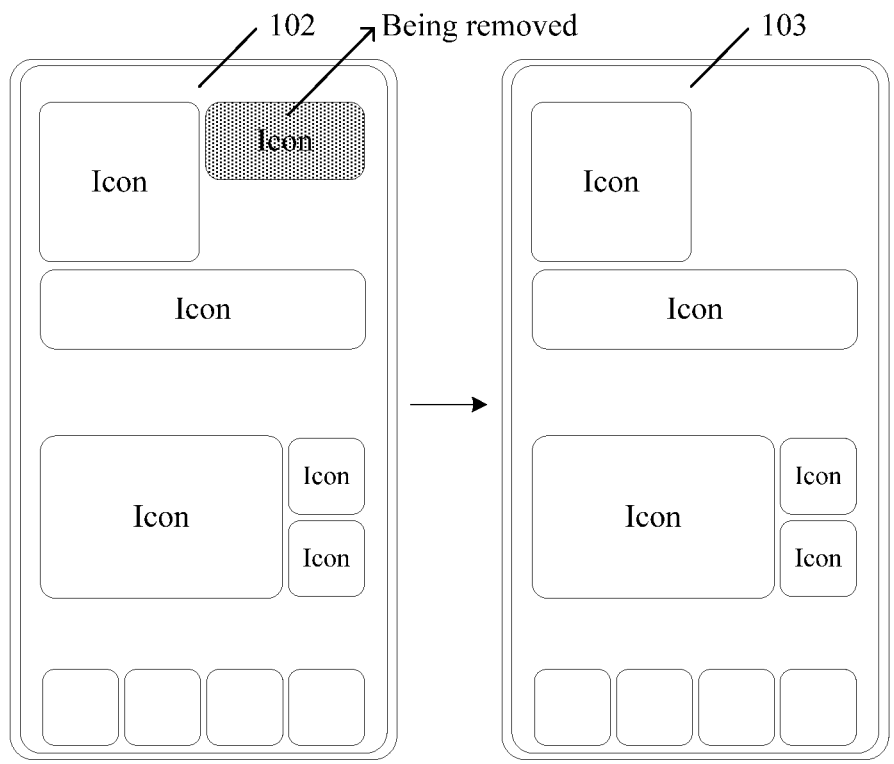
FIG. 10b is a schematic diagram of a page in which an icon is removed from a custom desktop layout page according to an embodiment of this application.

For a desktop page that uses a personalized desktop layout, if an application icon is removed, a blank location after the application icon is removed may be maintained, to maintain the current desktop layout style and avoid disruption of the desktop layout. For example, as shown in FIG. 10b, after an application icon on a desktop page 102 is removed, a location corresponding to the application icon keeps blank, and a desktop page 103 after the icon is removed is shown on the right side in the figure.

In this way, in this implementation, during desktop layout, it can be ensured that the desktop page that uses the original desktop layout is tidy, and a layout style of the desktop page that uses the target desktop layout is not disturbed.

According to the desktop layout method in this embodiment of this application, when a desktop of an electronic device is in a desktop layout setting state, N icon regions on a desktop page of the electronic device are determined according to a region selection input of a user, where each icon region is obtained by performing region merging on at least one unit block, and N is an integer greater than or equal to 1; to-be-placed application icons in the N icon regions are determined; and the application icons are filled in the N icon regions based on the to-be-placed application icons to generate a target desktop layout. In this way, the user can customize sizes of different desktop icon regions according to preferences, and determine application icons displayed in the different desktop icon regions, so that a personalized desktop layout can be generated. Compared with an existing desktop layout in a fixed format, the desktop layout method provided in this application has a higher degree of freedom, and can meet diversified and personalized desktop layout requirements of the user.

It should be noted that the desktop layout method provided in the embodiments of this application may be performed by a desktop layout apparatus, or a control module that is in the desktop layout apparatus and that is configured to perform the desktop layout method. In the embodiments of this application, that the desktop layout apparatus performs the desktop layout method is used as an example to describe the desktop layout apparatus provided in the embodiments of this application.

Figure 11:
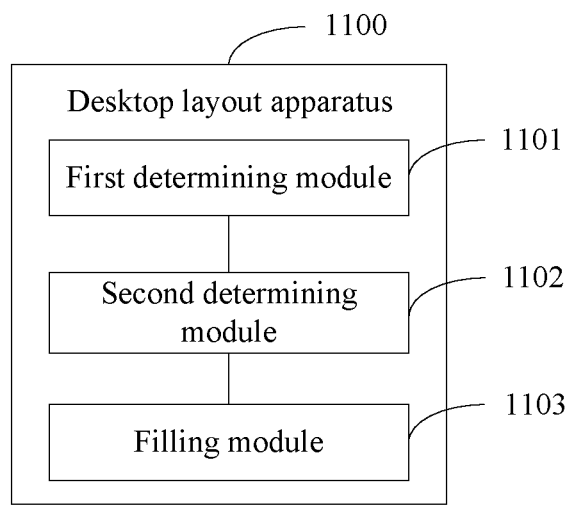
FIG. 11 is a schematic structural diagram of a desktop layout apparatus according to an embodiment of this application.

Referring to FIG. 11, FIG. 11 is a schematic structural diagram of a desktop layout apparatus according to an embodiment of this application. As shown in FIG. 11, a desktop layout apparatus 1100 includes:

a first determining module 1101, configured to: when a desktop of an electronic device is in a desktop layout setting state, determine N icon regions on a desktop page of the electronic device according to a region selection input of a user, where each icon region is obtained by performing region merging on at least one unit block, and N is an integer greater than or equal to 1;

a second determining module 1102, configured to determine to-be-placed application icons in the N icon regions; and a filling module 1103, configured to fill the application icons in the N icon regions based on the to-be-placed application icons to generate a target desktop layout.

Optionally, the desktop layout apparatus 1100 further includes:

a first processing module, configured to: in a case that a first preset input is received, enter the desktop layout setting state, where when the desktop of the electronic device is in the desktop layout setting state, M unit blocks in a selectable state are displayed on the desktop page, and M is an integer greater than 1.

Optionally, the first determining module 1101 includes:

a first receiving unit, configured to receive a selection input of the user on M unit blocks; and a first determining unit, configured to determine a corresponding target icon region based on selected unit blocks, where the target icon region is any icon region in the N icon regions.

Optionally, the first determining unit includes:

a first determining subunit, configured to determine four boundaries based on the selected unit blocks, where each boundary overlaps with a boundary of at least one unit block in the selected unit blocks; and a second determining subunit, configured to determine a rectangular region consisting of the four boundaries as the corresponding target icon region, where all selected unit blocks are located in the target icon region.

Optionally, the second determining module 1102 includes:

a second receiving module, configured to receive a second preset input of the user;

a second determining unit, configured to: in response to the second preset input, determine a score of each icon region in the N icon regions, and obtain a usage parameter of an application corresponding to each application icon on the desktop; and a third determining unit, configured to determine a to-be-placed application icon in each icon region based on the score of each icon region and the usage parameter of the application corresponding to each application icon on the desktop.

Optionally, the usage parameter is usage frequency; and the third determining unit is configured to determine the to-be-placed application icon in each icon region based on the score of each icon region and usage frequency of each application icon on the desktop and according to a rule that an application icon of an application with high usage frequency is placed in an icon region with a high score.

Optionally, the second determining unit includes:

a third determining subunit, configured to determine a first location score of the corresponding icon region based on a location of an upper boundary of each icon region;

a fourth determining subunit, configured to determine an area score of the corresponding icon region based on a quantity of unit blocks included in each icon region; and a fifth determining subunit, configured to determine a sum of the first location score and the area score of each icon region as a total score of the corresponding icon region.

Optionally, the third determining unit includes:

a sixth determining subunit, configured to: for icon regions whose total scores are different in the N icon regions, determine the to-be-placed application icon in the corresponding icon region according to the total score of each icon region and the usage parameter of the application corresponding to each application icon on the desktop;

a seventh determining subunit, configured to: for icon regions whose total scores are the same in the N icon regions, determine the to-be-placed application icon in the corresponding icon region according to the first location score of each icon region and the usage parameter of the application corresponding to each application icon on the desktop; and an eighth determining subunit, configured to: for icon regions whose total scores and first location scores are the same in the N icon regions, determine the to-be-placed application icon in the corresponding icon region according to a second location score of each icon region and the usage parameter of the application corresponding to each application icon on the desktop, where the second location score of the icon region is determined based on a location of a lower boundary of the icon region.

Optionally, the second determining module 1102 is configured to determine the to-be-placed application icons in the N icon regions based on an icon selection input of the user on an icon region in the N icon regions.

Optionally, the second determining module 1102 includes:

a first receiving subunit, configured to receive a touch input of the user on a first icon region in the N icon regions;

a display subunit, configured to: in response to the touch input, display Q to-be-selected application icons in a target region associated with the first icon region, where Q is a positive integer;

a second receiving subunit, configured to receive a selection input of the user on a target application icon in the Q to-be-selected application icons; and a ninth determining subunit, configured to: in response to the selection input, determine the target application icon as a to-be-placed application icon in the first icon region, where the first icon region is any icon region in the N icon regions.

Optionally, the desktop layout apparatus 1100 further includes:

a receiving module, configured to receive a third preset input of the user on a target desktop page corresponding to the target desktop layout;

a second processing module, configured to enter a desktop icon editing state in response to the third preset input, where the desktop icon editing state is a state in which an application icon in each icon region on the target desktop page may be replaced or deleted; and a third processing module, configured to dissolve the target desktop layout in a case that a fourth preset input is received.

Optionally, the desktop layout apparatus 1100 further includes:

a display module, configured to: in a case that an application corresponding to an application icon in a second icon region receives a notification message, display the notification message in the second icon region, where the second icon region is an icon region that is in the N icon regions and whose area is greater than a preset area threshold.

According to the desktop layout apparatus in this embodiment of this application, when a desktop of an electronic device is in a desktop layout setting state, N icon regions on a desktop page of the electronic device are determined according to a region selection input of a user, where each icon region is obtained by performing region merging on at least one unit block, and N is an integer greater than or equal to 1; to-be-placed application icons in the N icon regions are determined; and the application icons are filled in the N icon regions based on the to-be-placed application icons to generate a target desktop layout. In this way, the user can customize sizes of different desktop icon regions according to preferences, and determine application icons displayed in the different desktop icon regions, so that a personalized desktop layout can be generated. Compared with an existing desktop layout in a fixed format, the desktop layout method provided in this application has a higher degree of freedom, and can meet diversified and personalized desktop layout requirements of the user.

The desktop layout apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (ultra-mobile personal computer, UMPC), a netbook, or a personal digital assistant (personal digital assistant, PDA). The non-mobile electronic device may be a server, a network attached storage (Network Attached Storage, NAS), a personal computer (personal computer, PC), a television (television, TV), an automated teller machine, or a self-service machine. This is not specifically limited in the embodiments of this application.

The desktop layout apparatus in this embodiment of this application may be an apparatus with an operating system. The operating system may be an Android (Android) operating system, an iOS operating system, or another possible operating system. This is not specifically limited in this embodiment of this application.

The desktop layout apparatus provided in this embodiment of this application can implement the processes implemented in the method embodiments in FIG. 1. To avoid repetition, details are not described herein again.

Figure 12:
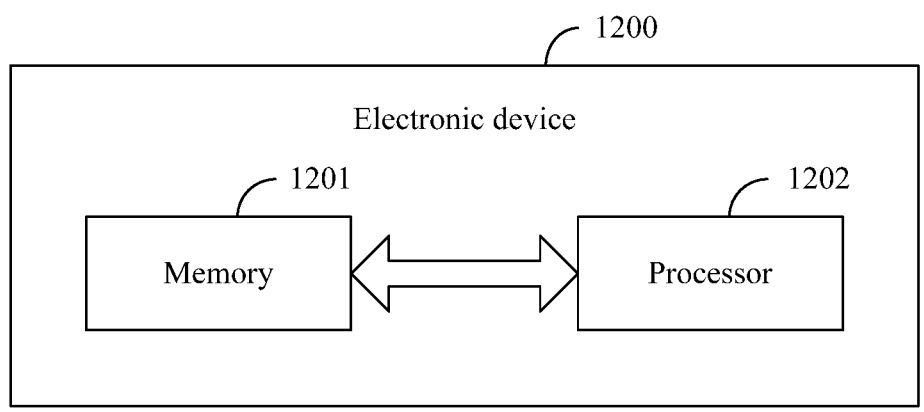
FIG. 12 is a schematic structural diagram of an electronic device according to an embodiment of this application.

Optionally, as shown in FIG. 12, an embodiment of this application further provides an electronic device 1200, including a processor 1201, a memory 1202, and a program or an instruction that is stored in the memory 1202 and that can be run on the processor 1201. When the program or the instruction is executed by the processor 1201, the processes of the foregoing desktop layout method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 13:
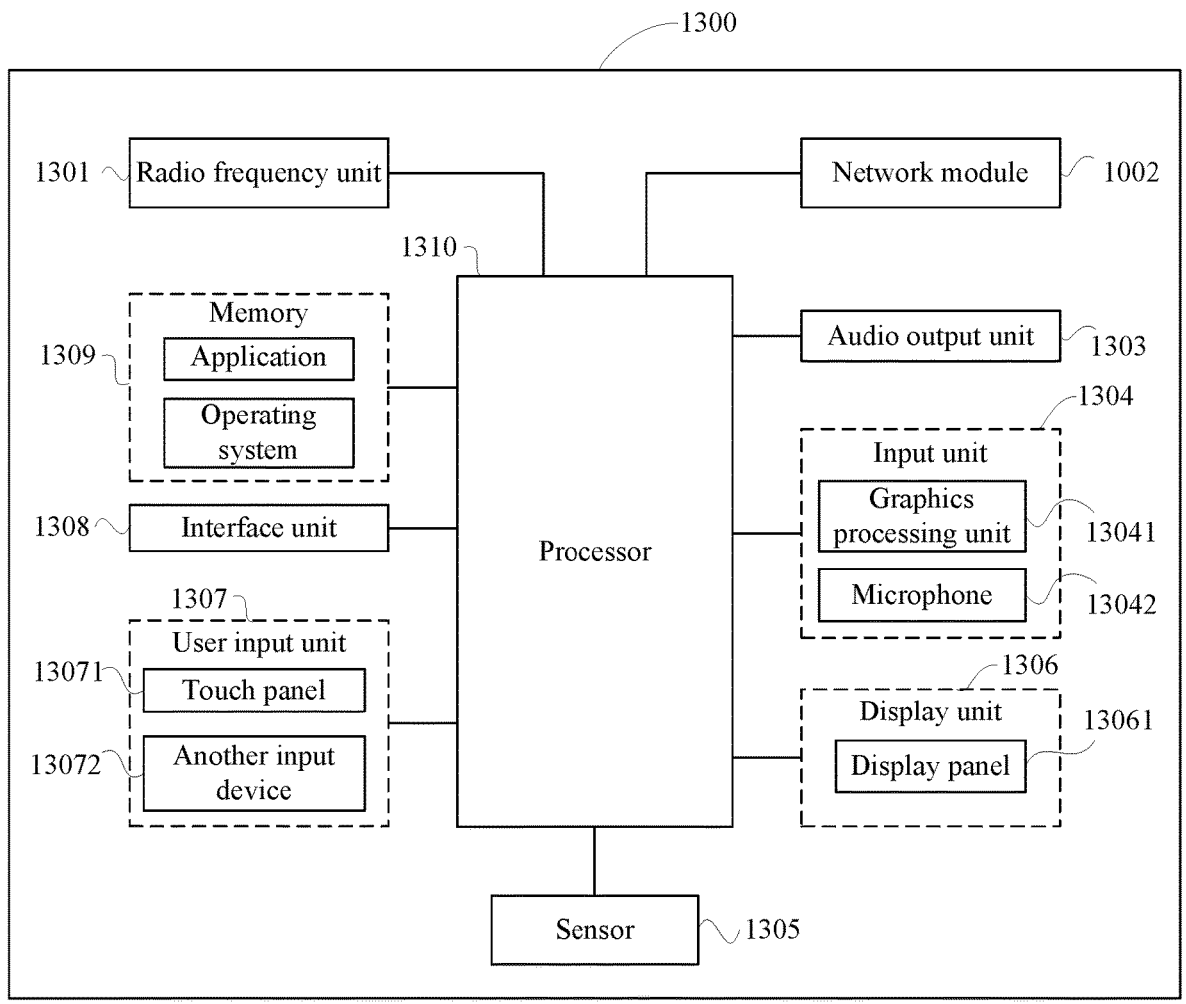
FIG. 13 is a schematic structural diagram of another electronic device according to an embodiment of this application.

FIG. 13 is a schematic structural diagram of hardware of an electronic device according to an embodiment of this application.

An electronic device 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art can understand that the electronic device 1300 may further include a power supply (such as a battery) that supplies power to each component. The power supply may be logically connected to the processor 1310 by using a power supply management system, to implement functions such as charging and discharging management, and power consumption management by using the power supply management system. The structure of the electronic device shown in FIG. 13 does not constitute a limitation on the electronic device. The electronic device may include components more or fewer than those shown in the diagram, a combination of some components, or different component arrangements. Details are not described herein.

The processor 1310 is configured to: when a desktop of an electronic device is in a desktop layout setting state, determine N icon regions on a desktop page of the electronic device according to a region selection input of a user, where each icon region is obtained by performing region merging on at least one unit block, and N is an integer greater than or equal to 1;

determine to-be-placed application icons in the N icon regions; and fill the application icons in the N icon regions based on the to-be-placed application icons to generate a target desktop layout.

Optionally, the processor 1310 is further configured to: in a case that a first preset input is received, enter the desktop layout setting state, where when the desktop of the electronic device is in the desktop layout setting state, M unit blocks in a selectable state are displayed on the desktop page, and M is an integer greater than 1.

Optionally, the user input unit 1307 is configured to receive a selection input of the user on M unit blocks; and the processor 1310 is further configured to determine a corresponding target icon region based on selected unit blocks, where the target icon region is any icon region in the N icon regions.

Optionally, the processor 1310 is further configured to: determine four boundaries based on the selected unit blocks, where each boundary overlaps with a boundary of at least one unit block in the selected unit blocks; and determine a rectangular region consisting of the four boundaries as the corresponding target icon region, where all selected unit blocks are located in the target icon region.

Optionally, the user input unit 1307 is further configured to receive a second preset input of the user; and the processor 1310 is further configured to: in response to the second preset input, determine a score of each icon region in the N icon regions, and obtaining a usage parameter of an application corresponding to each application icon on the desktop; and determine a to-be-placed application icon in each icon region based on the score of each icon region and the usage parameter of the application corresponding to each application icon on the desktop.

Optionally, the usage parameter is usage frequency; and the processor 1310 is further configured to determine the to-be-placed application icon in each icon region based on the score of each icon region and usage frequency of each application icon on the desktop and according to a rule that an application icon of an application with high usage frequency is placed in an icon region with a high score.

Optionally, the processor 1310 is further configured to determine a first location score of the corresponding icon region based on a location of an upper boundary of each icon region;

determine an area score of the corresponding icon region based on a quantity of unit blocks included in each icon region; and determine a sum of the first location score and the area score of each icon region as a total score of the corresponding icon region.

Optionally, the processor 1310 is further configured to: for icon regions whose total scores are different in the N icon regions, determining the to-be-placed application icon in the corresponding icon region according to the total score of each icon region and the usage parameter of the application corresponding to each application icon on the desktop;

for icon regions whose total scores are the same in the N icon regions, determine the to-be-placed application icon in the corresponding icon region according to the first location score of each icon region and the usage parameter of the application corresponding to each application icon on the desktop; and for icon regions whose total scores and first location scores are the same in the N icon regions, determine the to-be-placed application icon in the corresponding icon region according to a second location score of each icon region and the usage parameter of the application corresponding to each application icon on the desktop, where the second location score of the icon region is determined based on a location of a lower boundary of the icon region.

Optionally, the processor 1310 is further configured to determine the to-be-placed application icons in the N icon regions based on an icon selection input of the user on an icon region in the N icon regions.

Optionally, the user input unit 1307 is further configured to receive a touch input of the user on a first icon region in the N icon regions;

the display unit 1306 is configured to: in response to the touch input, display Q to-be-selected application icons in a target region associated with the first icon region, where Q is a positive integer;

the user input unit 1307 is further configured to receive a selection input of the user on a target application icon in the Q to-be-selected application icons; and the processor 1310 is further configured to: in response to the selection input, determining the target application icon as a to-be-placed application icon in the first icon region, where the first icon region is any icon region in the N icon regions.

Optionally, the user input unit 1307 is further configured to receive a third preset input of the user on a target desktop page corresponding to the target desktop layout;

the processor 1310 is further configured to: enter a desktop icon editing state in response to the third preset input, where the desktop icon editing state is a state in which an application icon in each icon region on the target desktop page may be replaced or deleted; and dissolve the target desktop layout in a case that a fourth preset input is received.

Optionally, the display unit 1306 is further configured to: in a case that an application corresponding to an application icon in a second icon region receives a notification message, display the notification message in the second icon region, where the second icon region is an icon region that is in the N icon regions and whose area is greater than a preset area threshold.

According to the electronic device in this embodiment of this application, when a desktop of an electronic device is in a desktop layout setting state, N icon regions on a desktop page of the electronic device are determined according to a region selection input of a user, where each icon region is obtained by performing region merging on at least one unit block, and N is an integer greater than or equal to 1; to-be-placed application icons in the N icon regions are determined; and the application icons are filled in the N icon regions based on the to-be-placed application icons to generate a target desktop layout. In this way, the user can customize sizes of different desktop icon regions according to preferences, and determine application icons displayed in the different desktop icon regions, so that a personalized desktop layout can be generated. Compared with an existing desktop layout in a fixed format, the desktop layout method provided in this application has a higher degree of freedom, and can meet diversified and personalized desktop layout requirements of the user.

It should be understood that, in this embodiment of this application, the input unit 1304 may include a graphics processing unit (Graphics Processing Unit, GPU) 13041 and a microphone 13042, and the graphics processing unit 13041 processes image data of a still picture or a video obtained by an image capture apparatus (such as a camera) in a video capture mode or an image capture mode. The display unit 1306 may include a display panel 13061. Optionally, the display panel 13061 may be configured in a form such as a liquid crystal display or an organic light-emitting diode. The user input unit 1307 includes a touch panel 13071 and another input device 13072. The touch panel 13071 is also referred to as a touchscreen. The touch panel 13071 may include two parts: a touch detection apparatus and a touch controller. The another input device 13072 may include but is not limited to a physical keyboard, a functional button (such as a volume control button or a power on/off button), a trackball, a mouse, and a joystick. Details are not described herein. The memory 1309 may be configured to store a software program and various data, including but not limited to an application and an operating system. An application processor and a modem processor may be integrated into the processor 1310, the application processor mainly processes an operating system, a user interface, an application, and the like, and the modem processor mainly processes wireless communication. It can be understood that, alternatively, the modem processor may not be integrated into the processor 1310.

An embodiment of this application further provides a readable storage medium. The readable storage medium stores a program or an instruction, and when the program or the instruction is executed by a processor, the processes of the foregoing desktop layout method embodiment are implemented and a same technical effect can be achieved. To avoid repetition, details are not described herein again.

The processor is a processor in the electronic device in the foregoing embodiment. The readable storage medium includes a computer-readable storage medium, such as a computer read-only memory (Read-Only Memory, ROM), a random access memory (Random Access Memory, RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing desktop layout method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or merged. In addition, features described with reference to some examples may be merged in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

It should be understood that division of the modules of the foregoing device is merely division of logical functions. In actual implementation, all or some of the modules may be integrated into one physical entity, or the modules may be physically separated. All of these modules may be implemented in a form of software invoked by using a processing element, or may be implemented in a form of hardware; or some of the modules may be implemented in a form of software invoked by using a processing element, and some of the modules are implemented in a form of hardware. For example, the receiving module may be a processing element separately disposed, or may be integrated in a chip of the foregoing apparatus for implementation. In addition, the determining module may be stored in a memory of the foregoing apparatus in a form of program code, and is invoked by a processing element of the foregoing apparatus to perform a function of the foregoing receiving module. Implementations of the other modules are similar thereto. In addition, these modules may be all or partially integrated together, or may be implemented independently. The processing element herein may be an integrated circuit and has a signal processing capability. In an implementation process, the steps in the foregoing method or the foregoing modules can be implemented by using a hardware integrated logical circuit in the processing element, or by using instructions in a form of software.

For example, the modules, units, subunits, or submodules may be configured as one or more integrated circuits for implementing the foregoing method, for example, one or more application specific integrated circuits (Application Specific Integrated Circuit, ASIC), one or more microprocessors (digital signal processor, DSP), or one or more field programmable gate arrays (Field Programmable Gate Array, FPGA). For another example, when a module above is implemented by invoking program code by using a processing element, the processing element may be a general-purpose processor, for example, a central processing unit (Central Processing Unit, CPU) or another processor that can invoke program code. For another example, these modules may be integrated together, and implemented in a form of a system-on-a-chip (system-on-a-chip, SOC).

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A desktop layout method, comprising:
   when a desktop of an electronic device is in a desktop layout setting state, determining N icon regions on a desktop page of the electronic device according to a region selection input of a user, wherein each icon region is obtained by performing region merging on at least one unit block, and N is an integer greater than or equal to 1;
   determining to-be-placed application icons in the N icon regions; and
   filling the application icons in the N icon regions based on the to-be-placed application icons to generate a target desktop layout; wherein
   the determining to-be-placed application icons in the N icon regions comprises:
   receiving a second preset input of the user;
   in response to the second preset input, determining a score of each icon region in the N icon regions, and obtaining a usage parameter of an application corresponding to each application icon on the desktop; and
   determining a to-be-placed application icon in each icon region based on the score of each icon region and the usage parameter of the application corresponding to each application icon on the desktop; and
   the determining a score of each icon region in the N icon regions comprises:
   determining a first location score of the corresponding icon region based on a location of an upper boundary of each icon region;
   determining an area score of the corresponding icon region based on a quantity of unit blocks comprised in each icon region; and
   determining a sum of the first location score and the area score of each icon region as a total score of the corresponding icon region.

2. The method according to claim 1, wherein before the determining N icon regions on a desktop page of the electronic device according to a region selection input of a user, the method further comprises:
   in a case that a first preset input is received, entering, by the electronic device, the desktop layout setting state, wherein
   when the desktop of the electronic device is in the desktop layout setting state, M unit blocks in a selectable state are displayed on the desktop page, and M is an integer greater than 1.

3. The method according to claim 2, wherein the determining N icon regions on a desktop page of the electronic device according to a region selection input of a user comprises:
   receiving a selection input of the user on M unit blocks; and
   determining a corresponding target icon region based on selected unit blocks, wherein the target icon region is any icon region in the N icon regions.

4. The method according to claim 3, wherein the determining a corresponding target icon region based on selected unit blocks comprises:
   determining four boundaries based on the selected unit blocks, wherein each boundary overlaps with a boundary of at least one unit block in the selected unit blocks; and
   determining a rectangular region consisting of the four boundaries as the corresponding target icon region, wherein all selected unit blocks are located in the target icon region.

5. The method according to claim 1, wherein the usage parameter is usage frequency; and
   the determining a to-be-placed application icon in each icon region based on the score of each icon region and the usage parameter of the application corresponding to each application icon on the desktop comprises:

determining the to-be-placed application icon in each icon region based on the score of each icon region and usage frequency of the application corresponding to each application icon on the desktop and according to a rule that an application icon of an application with high usage frequency is placed in an icon region with a high score.

6. The method according to claim 1, wherein the determining a to-be-placed application icon in each icon region based on the score of each icon region and the usage parameter of the application corresponding to each application icon on the desktop comprises:
for icon regions whose total scores are different in the N icon regions, determining the to-be-placed application icon in the corresponding icon region according to the total score of each icon region and the usage parameter of the application corresponding to each application icon on the desktop;
for icon regions whose total scores are the same in the N icon regions, determining the to-be-placed application icon in the corresponding icon region according to the first location score of each icon region and the usage parameter of the application corresponding to each application icon on the desktop; and
for icon regions whose total scores and first location scores are the same in the N icon regions, determining the to-be-placed application icon in the corresponding icon region according to a second location score of each icon region and the usage parameter of the application corresponding to each application icon on the desktop, wherein the second location score of the icon region is determined based on a location of a lower boundary of the icon region.

7. The method according to claim 1, wherein the determining to-be-placed application icons in the N icon regions comprises:
receiving a touch input of the user on a first icon region in the N icon regions;
in response to the touch input, displaying Q to-be-selected application icons in a target region associated with the first icon region, wherein Q is a positive integer;
receiving a selection input of the user on a target application icon in the Q to-be-selected application icons; and
in response to the selection input, determining the target application icon as a to-be-placed application icon in the first icon region, wherein
the first icon region is any icon region in the N icon regions.

8. The method according to claim 1, wherein after the filling the application icons in the N icon regions to generate a target desktop layout, the method further comprises:
in a case that an application corresponding to an application icon in a second icon region receives a notification message, displaying the notification message in the second icon region, wherein the second icon region is an icon region that is in the N icon regions and whose area is greater than a preset area threshold.

9. An electronic device, comprising a processor, a memory, and a program or an instruction that is stored in the memory and that can be run on the processor, wherein when the program or the instruction is executed by the processor, the following steps are implemented:
when a desktop of the electronic device is in a desktop layout setting state, determining N icon regions on a desktop page of the electronic device according to a region selection input of a user, wherein each icon region is obtained by performing region merging on at least one unit block, and N is an integer greater than or equal to 1;
determining to-be-placed application icons in the N icon regions; and
filling the application icons in the N icon regions based on the to-be-placed application icons to generate a target desktop layout; wherein
the determining to-be-placed application icons in the N icon regions comprises:
receiving a second preset input of the user;
in response to the second preset input, determining a score of each icon region in the N icon regions, and obtaining a usage parameter of an application corresponding to each application icon on the desktop; and
determining a to-be-placed application icon in each icon region based on the score of each icon region and the usage parameter of the application corresponding to each application icon on the desktop; and
the determining a score of each icon region in the N icon regions comprises:
determining a first location score of the corresponding icon region based on a location of an upper boundary of each icon region;
determining an area score of the corresponding icon region based on a quantity of unit blocks comprised in each icon region; and
determining a sum of the first location score and the area score of each icon region as a total score of the corresponding icon region.

10. The electronic device according to claim 9, wherein when the program or the instruction is executed by the processor, the following step is further implemented:
before the determining N icon regions on a desktop page of the electronic device according to a region selection input of a user, in a case that a first preset input is received, entering, by the electronic device, the desktop layout setting state, wherein
when the desktop of the electronic device is in the desktop layout setting state, M unit blocks in a selectable state are displayed on the desktop page, and M is an integer greater than 1.

11. The electronic device according to claim 10, wherein the determining N icon regions on a desktop page of the electronic device according to a region selection input of a user comprises:
receiving a selection input of the user on M unit blocks; and
determining a corresponding target icon region based on selected unit blocks, wherein the target icon region is any icon region in the N icon regions.

12. The electronic device according to claim 11, wherein the determining a corresponding target icon region based on selected unit blocks comprises:
determining four boundaries based on the selected unit blocks, wherein each boundary overlaps with a boundary of at least one unit block in the selected unit blocks; and
determining a rectangular region consisting of the four boundaries as the corresponding target icon region, wherein all selected unit blocks are located in the target icon region.

13. The electronic device according to claim 9, wherein the usage parameter is usage frequency; and
the determining a to-be-placed application icon in each icon region based on the score of each icon region and the usage parameter of the application corresponding to each application icon on the desktop comprises:
determining the to-be-placed application icon in each icon region based on the score of each icon region and usage frequency of the application corresponding to each application icon on the desktop and according to a rule that an application icon of an application with high usage frequency is placed in an icon region with a high score.

14. The electronic device according to claim 9, wherein the determining a to-be-placed application icon in each icon region based on the score of each icon region and the usage parameter of the application corresponding to each application icon on the desktop comprises:
for icon regions whose total scores are different in the N icon regions, determining the to-be-placed application icon in the corresponding icon region according to the total score of each icon region and the usage parameter of the application corresponding to each application icon on the desktop;
for icon regions whose total scores are the same in the N icon regions, determining the to-be-placed application icon in the corresponding icon region according to the first location score of each icon region and the usage parameter of the application corresponding to each application icon on the desktop; and
for icon regions whose total scores and first location scores are the same in the N icon regions, determining the to-be-placed application icon in the corresponding icon region according to a second location score of each icon region and the usage parameter of the application corresponding to each application icon on the desktop, wherein the second location score of the icon region is determined based on a location of a lower boundary of the icon region.

15. The electronic device according to claim 9, wherein the determining to-be-placed application icons in the N icon regions comprises:
receiving a touch input of the user on a first icon region in the N icon regions;
in response to the touch input, displaying Q to-be-selected application icons in a target region associated with the first icon region, wherein Q is a positive integer;
receiving a selection input of the user on a target application icon in the Q to-be-selected application icons; and
in response to the selection input, determining the target application icon as a to-be-placed application icon in the first icon region, wherein
the first icon region is any icon region in the N icon regions.

16. The electronic device according to claim 9, wherein when the program or the instruction is executed by the processor, the following step is further implemented:
after the filling the application icons in the N icon regions to generate a target desktop layout, in a case that an application corresponding to an application icon in a second icon region receives a notification message, displaying the notification message in the second icon region, wherein the second icon region is an icon region that is in the N icon regions and whose area is greater than a preset area threshold.

\* \* \* \* \*